US012267182B2

(12) United States Patent
Ganesan et al.

(10) Patent No.: US 12,267,182 B2
(45) Date of Patent: Apr. 1, 2025

(54) RECEIVER SYNCHRONIZATION

(71) Applicant: Texas Instruments Incorporated, Dallas, TX (US)

(72) Inventors: Raghu Ganesan, Bengaluru (IN); Saravanakkumar Radhakrishnan, Aruppukottai (IN); Gaurav Aggarwal, Delhi (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/117,511

(22) Filed: Mar. 6, 2023

(65) Prior Publication Data

US 2023/0208675 A1 Jun. 29, 2023

Related U.S. Application Data

(63) Continuation of application No. 17/082,208, filed on Oct. 28, 2020, now Pat. No. 11,601,302.

(30) Foreign Application Priority Data

Mar. 13, 2020 (IN) .............................. 202041010827

(51) Int. Cl.
*H04L 12/40* (2006.01)
*H04L 25/03* (2006.01)

(52) U.S. Cl.
CPC .. *H04L 12/40039* (2013.01); *H04L 25/03267* (2013.01)

(58) Field of Classification Search
CPC ... H04L 7/0058; H04L 7/0272; H04L 7/0274; H04L 12/40039; H04L 12/6418; H04L 25/03267; H04L 27/066; H04L 43/0823; H04L 2012/6467; H04L 2027/004; H04L 2027/0069; H04L 2027/0073; H04L 2027/0097
USPC ....... 375/232, 233, 236, 326, 344, 345, 348, 375/362, 373, 374; 327/146, 148, 151, 327/155, 157, 160
See application file for complete search history.

(56) References Cited

U.S. PATENT DOCUMENTS

| | | | |
|---|---|---|---|
| 6,775,334 B1* | 8/2004 | Liu | H04N 5/21 375/341 |
| 7,085,328 B2* | 8/2006 | Lin | H04L 27/34 375/261 |
| 7,254,198 B1* | 8/2007 | Manickam | H04L 25/03057 375/233 |
| 10,305,704 B1* | 5/2019 | Kenyon | H04L 25/03057 |
| 2007/0201583 A1* | 8/2007 | Yen | H04L 25/022 375/340 |

(Continued)

*Primary Examiner* — Young T. Tse
(74) *Attorney, Agent, or Firm* — Valerie M. Davis; Frank D. Cimino

(57) ABSTRACT

A receiver circuit includes a feedback loop including a device. The receiver circuit also includes a register and a sequencer. The sequencer is configured to, responsive to an error signal being below a threshold value, cause the register to store a value indicative of the state of the feedback loop. The sequencer is also configured to cause the feedback loop to transition to a lower power state, and, responsive to a detected wake-up event, cause the previously stored value indicative of the state of the feedback loop to be loaded from the register into the device and enable the feedback loop.

22 Claims, 5 Drawing Sheets

(56) References Cited

U.S. PATENT DOCUMENTS

2014/0355147 A1\* 12/2014 Cideciyan ........ G11B 20/10009
  360/31
2016/0352557 A1\* 12/2016 Liao .................... H04L 27/3809
2020/0092144 A1\* 3/2020 Ganesan ............. H04L 25/0216

\* cited by examiner

RECEIVER SYNCHRONIZATION

CROSS-REFERENCE TO RELATED APPLICATIONS

The application is a continuation of U.S. patent application Ser. No. 17/082,208, filed on Oct. 28, 2020, which claims priority to India Provisional Application No. 202041010827, which was filed Mar. 13, 2020, is titled "Fast Synchronization Methods For Energy Efficient Ethernet (EEE)," and is hereby incorporated herein by reference in its entirety.

BACKGROUND

Energy Efficient Ethernet (EEE) is a capability by which Ethernet physical layers (PHY) on both sides of a communication link can save power during periods of low link utilization. When the controlling software determines that no data needs to be sent over the communication link, it can issue a low-power idle (LPI) request to the Ethernet controller PHY. The PHY will then send LPI symbols for a specified time onto the link, and then both the PHYs on both ends of the link will enter a low power state. Refresh signals are sent periodically by the transmitter PHY in an attempt to maintain link signaling integrity. When there is data to transmit, a normal IDLE signal is sent for a predetermined period of time. The receiver responds by transitioning from its PHY from the low power state to a fully operational state.

SUMMARY

In one example, a method includes, responsive to an error signal being below a threshold value, storing a feedback loop state value. The method further includes transitioning a device within the feedback loop to a lower power state, detecting a wake-up event, and, responsive to the detected wake-up event, loading the previously stored feedback loop state value and enabling the feedback loop.

In another example, a receiver circuit includes a feedback loop including a device. The receiver circuit also includes a register and a sequencer. The sequencer is configured to, responsive to an error signal being below a threshold value, cause the register to store a value indicative of the state of the feedback loop. The sequencer is also configured to cause the feedback loop to transition to a lower power state, and, responsive to a detected wake-up event, cause the previously stored value indicative of the state of the feedback loop to be loaded from the register into the device and enable the feedback loop.

BRIEF DESCRIPTION OF THE DRAWINGS

For a detailed description of various examples, reference will now be made to the accompanying drawings in which.

DETAILED DESCRIPTION

Figure 1:
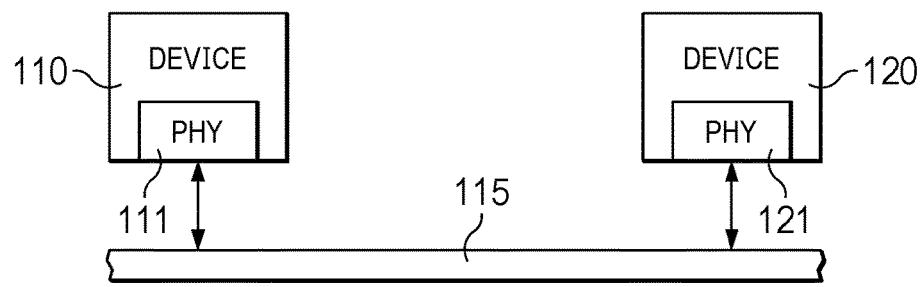
FIG. 1 illustrates two devices 110 and 120 communicating with one another over a communication link.

FIG. 1 illustrates two devices 110 and 120 communicating with one another over a communication link 115 (e.g., Ethernet). Each device has a PHY. Device 110 has a PHY 111 and device 120 has a PHY 121. The devices 110 and 120 use their respective PHYs to send and receive packets back and forth. If a device, for example device 110, has no data to transmit, per the protocol described above (EEE), both PHYs can be caused to enter a lower power state (i.e., consume less power than a fully operational state).

Figure 2:
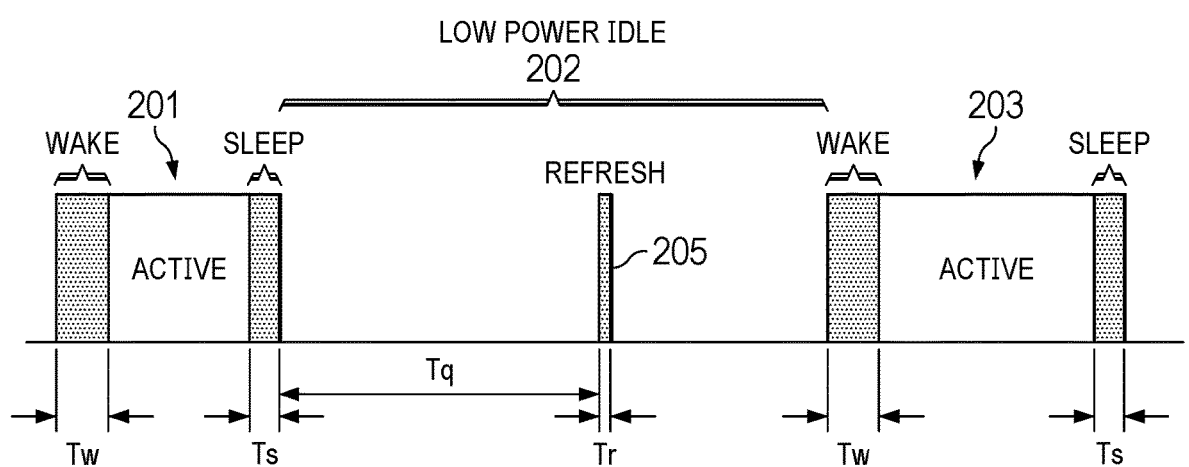
FIG. 2 illustrates an example of a timing sequence between two devices communicating over a communication link.

FIG. 2 illustrates a timing sequence for two Ethernet-enabled devices to enter an LPI state during periods of time when there are no packets to transmit across the communication link. FIG. 2 illustrates two active states 201 and 203 separated by an LPI state 202. As active state 201 ends, the controlling software of one device (110 or 120) issues an LPI request to its PHY (11, 121) which then sends LPI symbols for a specified time (Ts) onto the link. During the LPI state 202, some of the analog and/or digital components of the transmit and receive PHYs are in a power-off state and/or in a lower power consumption mode of operation to save power. Further, during the LPI state 202, refresh cycles 205 occur at intervals defined by Tq. In one example, Tq is 20-22 milliseconds (ms), and thus refresh cycles occur during the LPI state 2202 every 20-22 ms. Each refresh cycle is Tr seconds wide (e.g., 200-220 microseconds). Each refresh cycle includes one PHY sending one or more symbols over the link to cause the other PHY to wake up and attempt to resynchronize its feedback loops (e.g., adjust its gain settings, equalizer filter coefficients, etc.). The Ts time period is the maximum time during which a PHY can transition to a lower power (e.g., sleep) state.

When there is data to transmit during the LPI state 202, a normal IDLE signal is sent by the transmitting device for a predetermined period of time to wake up the receiver PHY. The receiver PHY responds by transitioning from its low power state to a fully operational state. The time period Tw is the time period during which the receiver PHY has to transition to the fully operational state. During the relatively short Tw time period, the receiver PHY resynchronizes its internal feedback loops and equalizer states. Given the complexity of the receiver PHY, some receiver PHYs may not be able to resynchronize their states in sufficient time to meet the Tw specification. In one example, Tw is 30-35 microsecond, meaning that the receiving PHY should be in a fully operational state within 35 microseconds and ready to receive data. The PHY has multiple feedback loops, such as those described below, and each feedback loop takes time to reach a lock state (i.e., a steady state). The loops run in parallel and noise on a first loop can increase the time over which a second loop reaches its lock state.

Figure 3:
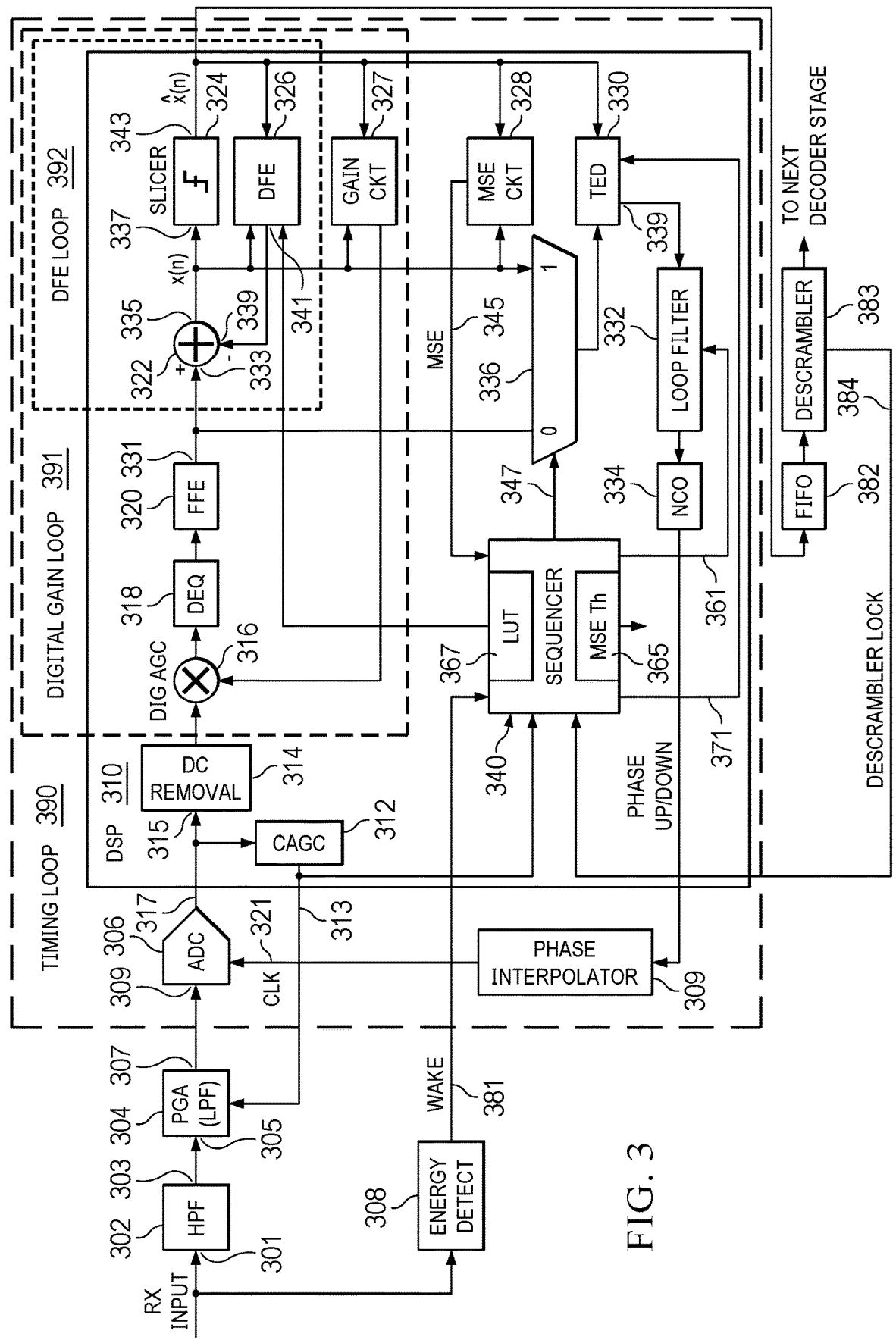
FIG. 3 illustrates an example of at least a portion of a receiver's circuitry of an Ethernet physical interface (PHY).

FIG. 3 illustrates an example of at least a portion of the receiver circuitry of an Ethernet PHY. The example of FIG. 3 includes a high pass filter (HPF) 302, a programmable gain amplifier (PGA) 304, an analog-to-digital converter (ADC) 306, energy detector 308, phase interpolator 309, and a digital signal processor (DSP) 310. The DSP 310 includes a coarse automatic gain control (CAGC) 312, direct current (DC) removal 314, a mixer 316, a digital equalizer (DEQ) 318, a feed forward equalizer (FFE) 320, a summer 322, a slicer 324, a decision feedback equalizer (DFE) 326, a gain circuit 327, a mean square error (MSE) 328, a timing error detector (TED) 330, a loop filter 332, a numerically-controlled oscillator 334, and a sequencer 340. As will be explained below, the example receiver circuitry of FIG. 3 includes multiple feedback loops—a timing loop 390, a digital gain loop 391, and a DFE loop 392. The feedback loops 390-392 are described below. The loops generally run in parallel and an error in one loop can detrimentally impact the speed at which another loop achieves its lock state. For example, an error in the DFE loop 392 can cause the timing loop 390 to take additional time to lock. Various techniques are described below as well to decrease the time required by the receiver circuitry to resynchronize its loops following a wake-event.

The timing loop 390 includes, among possibly other components, the slicer 324, TED 330, loop filter 332, NCO 334, and phase interpolator 309. The digital gain loop 391 includes, among possibly other components, the mixer 316, DEQ 38, FFE 320, slicer 324, and gain circuit 327. The DFE loop 392 includes, among possibly other components, the slicer 324, DFE 326, and the summer 322.

The HPF 302 includes an input 301 and an output 303. The receive (Rx) signal 300 is provided to input 301 of the HPF 302. The HPF 302 high-pass filters the RX signal and provides the filtered output signal from its output 303 to the input 305 of the PGA 304. The PGA 304 has a gain that is programmable via a control signal 313 from CAGC 312. Control signal 313 may provide a multi-bit value to the PGA 304 to specify a particular gain setting for the PGA. The PGA 304 has multiple programmable gain settings based on the control signal 313. The CAGC 312 generates the control signal 313 based on the magnitude of the digital signal from the output of the ADC 306. The output 307 of the PGA 304 is coupled to an input 309 of ADC 306. The ADC 306 converts the output signal from the PGA 304 to a digital representation (digital signal 317). The clock (CLK) 321 provided to the ADC 306 by the phase interpolator 309 is used by the ADC for timing of its conversion of the signal from the PGA to the digital signal 317. That is, CLK 321 indicates when the ADC 306 is to sample its input analog signal form the PGA 304. The frequency and phase of CLK 321 is continuously adjusted by the timing loop 390 to ensure that the PGA's output signal is sampled by the ADC 306 at a suitable eye opening point (e.g., in the middle of the eye).

The output 317 of the ADC 306 is coupled to the input 315 of DC removal 314 and to the CAGC 312. DC removal 314 adjusts the direct current (DC) level of the ADC's digital output signal 317 to remove any DC offset. The digital gain loop 391 boosts the magnitude of the digital signals from the ADC 306 to an appropriate level so that the slicer 324 can be make a correct output decision. DEQ 318 implements digital equalization which filters digital signals with an inverse of the channel impulse response to remove high frequency noise. The feed forward equalization implemented by the FFE 320 is used to cancel the residual pre-cursor inter-symbol interference (ISI) present in the signal. The output 331 of FFE 320 is coupled to the input 333 of summer 322. The summer 322 has another input 339 to which the output 341 of DFE 326 is coupled. The summer 322 subtracts the output from DFE 326 from the output from the FFE 320. The summed output signal (x(n)) is provided by the output 335 of summer 322 to the input 337 of slicer 324. The slicer 324 comprises comparators that output a decision from the slicer 324 (e.g., −1, 0, +1) based on its input x(n). The output 343 of slicer 324 is coupled to respective inputs of DFE 326, gain circuit 328, MSE circuit 328, and TED 330. DFE 326 comprises another equalization filter that cancels the ISI caused by previous decision symbols also known as post-cursor ISI equalization. MSE circuit 328 determines the mean square error of the slicer's output signal ($\hat{x}(n)$) relative to its input signal (x(n)) and outputs an MSE value 345. The MSE value 345 is a measure of the noise on the Rx input signal and is provided to the sequencer 340.

Figure 7:
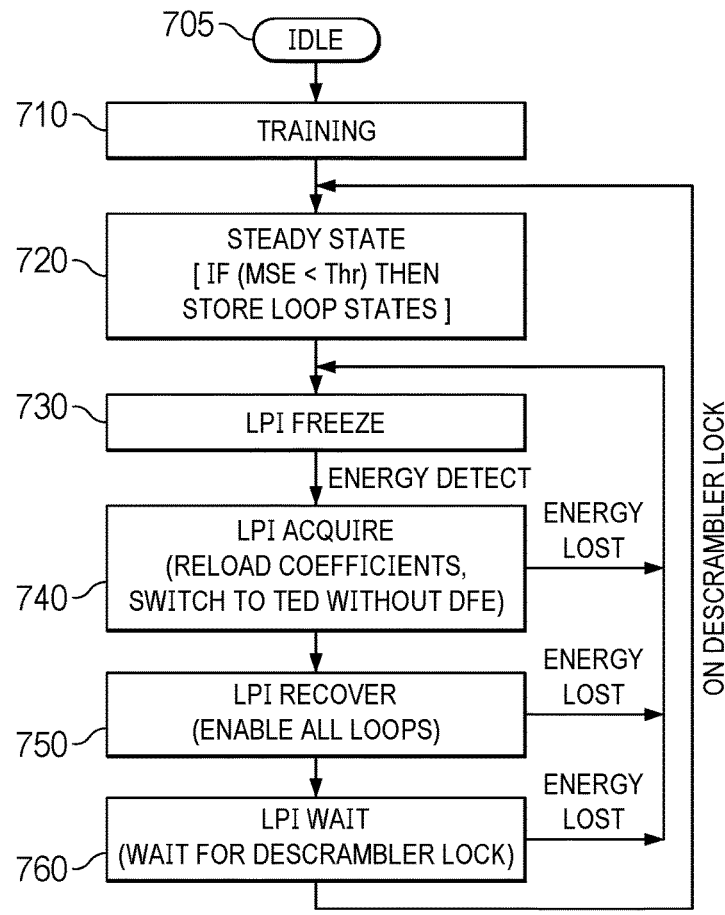
FIG. 7 illustrates an example of a state diagram for a sequencer within the receiver's circuitry.

The output 343 of slicer 324 is coupled to an input of a first-in, first-out (FIFO) buffer 382 which stores decisions from slicer 324. The output of FIFO buffer 382 is coupled to an input of a descrambler 383. The output of the descrambler 383 is provided to a subsequent decoder stage (not shown) of the receiver's PHY. Responsive to the descrambler 383 achieving its own lock state, the descrambler 383 asserts a descrambler lock signal 384 to the sequencer 340. The sequencer 340 uses the descrambler lock signal 384 to control a state transition implemented by the sequencer 340 (e.g., the transition from a wait state to a steady state as illustrated in FIG. 7 and explained below).

The TED 330 receives the slicer output, $\hat{x}(n)$. The input of TED 330 is coupled to the output of multiplexer 336. Multiplexer 336 has a 0-input and a 1-input. The 0-input is coupled to the output of FFE 320 and the 1-input of multiplexer 336 is coupled to the input 337 of slicer 324. Thus, through multiplexer 336, the TED 330 receives either the FFE's output signal or the slicer's input signal. The sequencer 340 controls the multiplexer 336 through control signal 347. If the FFE's output is selected to be provided to the TED 330, then that input signal does not include DFE correction. On the other hand, if the slicer's input (output of summer 322) is selected to be provided to the TED 330, then, that input signal ($\hat{x}(n)$) includes DFE correction.

The TED 330 estimates the timing error by estimating the ISI between the current symbol and the previous symbol. The TED 330 attempts to bring the ISI to a value of 0 to thereby lock to a suitable eye-opening point. The output 339 of the TED 330 is coupled to the loop filter 332. The loop filter 332 filters the timing error values from the TED 330. The filtered timing error values from the loop filter 332 are then provided to the NCO 334 which generates UP/DOWN pulses. The UP/DOWN pulses are provided to the phase interpolator 309. In response to the UP/DOWN pulses, the phase interpolator adjusts the phase of CLK 321 in incremental steps. In one implementation, the phase interpolator 309 is a 6-bit interpolator which provides for 64 steps. The phase interpolator responds to an UP pulse by lagging the dock signal. In response to a DOWN pulse, the phase interpolator causes the phase of the dock signal to lead.

The energy detector 308 is a voltage comparator that compares the voltage of the input signal (RX input) to a threshold voltage to determine the presence or absence of a signal. Responsive to the voltage of RX input exceeding the threshold, the energy detector 308 asserts the WAKE signal 381 to the sequencer 340 to indicate the presence of an input signal. As will be explained below, the sequencer 340 responds to the asserted WAKE signal 381 to control the timing, digital gain, and DFE loops during the time period that the loops are reaching their lock state.

During the LPI phase 202 (FIG. 2), every Tq seconds (e.g., 20-22 ms), a transmitter initiates a refresh cycle 205. During each refresh cycle, the DFE, digital gain, and timing loops are enabled for a short period of time (e.g., 200-220 microseconds). That time period, however, may be short enough that any one given feedback loop within the receiver's PHY may not have sufficient time to fully settle to a steady state level (also referred to as a lock state). When that happens, the refresh cycle terminates with residual error present in one or more of the loops. Following the end of a refresh cycle, the loops are frozen meaning that, for example, the clocks to the loops cease and the state of the loops thus discontinues to advance. Any residual error that is present in a loop when its state is frozen is maintained in the loop and is thus carried forward to the next refresh cycle or wake event. The disclosed examples reduce or avoid the accumulation of residual error.

Figure 4:
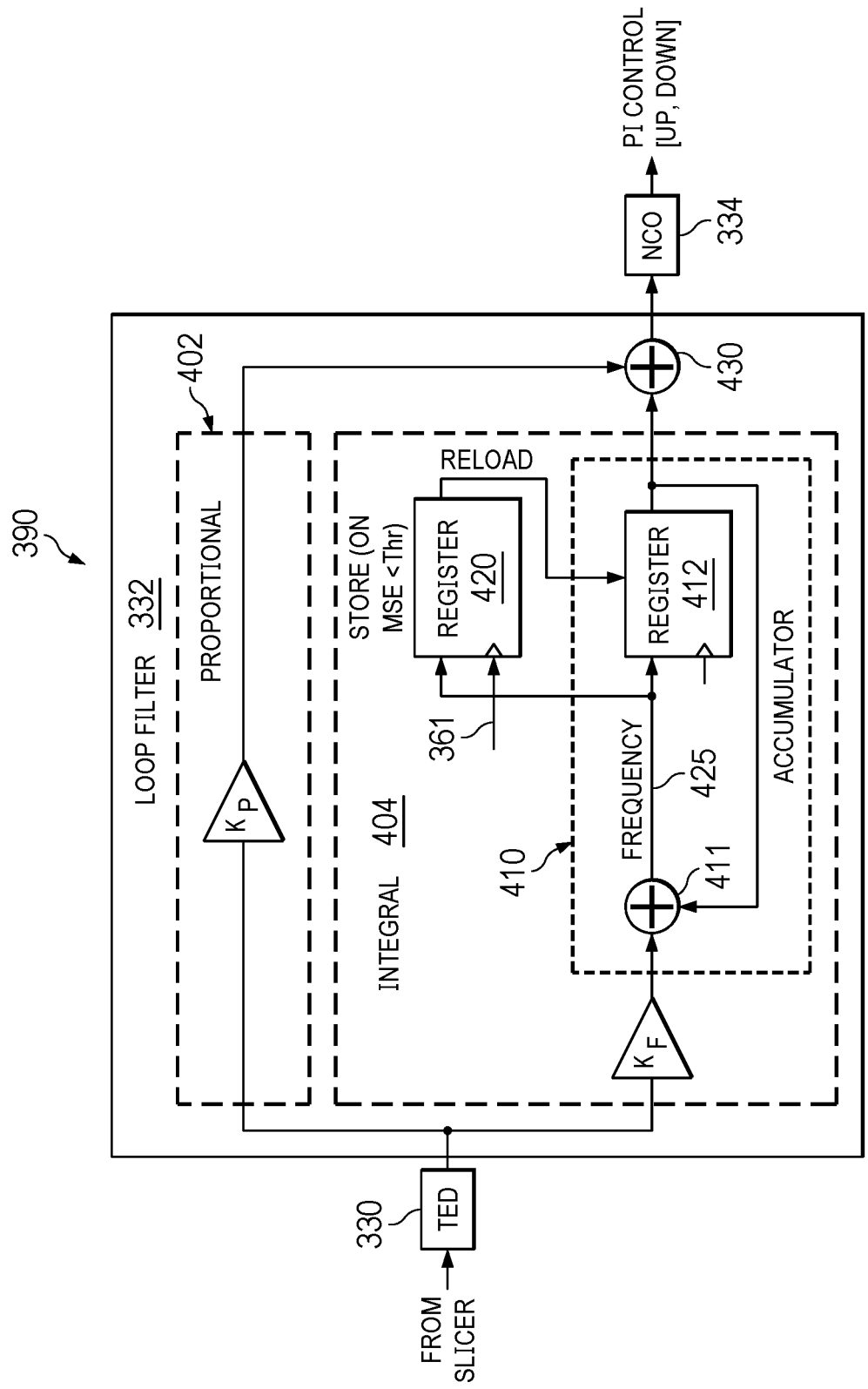
FIG. 4 shows an example of a portion of a timing loop within the receiver's circuitry.

FIG. 4 shows a portion of the timing loop 390 including the TED 330, loop filter 332, and NCO 334. The loop filter 332 includes a proportional signal path 402 and an integral signal path 404 including a variable gain for each path denoted as Kp and Kf, respectively. A summer 430 adds the signal from the proportional signal path 402 to the signal from the integral signal path 404 to produce an error value (shown as FREQ 425 in FIG. 4) indicative of the frequency at which the ADC 306 is clocked for its sampling and conversion of analog signal from the PGA 304. The integral signal path 404 includes an accumulator 410 and a register 420. The accumulator 410 includes a summer 411 and a register 412. The output of register 412 is added to the next value and the updated sum from summer 411 is used to overwrite the current register value.

When the sequencer 340 detects that the MSE value 345 from the MSE circuit 328 has fallen below the MSE threshold 365 stored in or otherwise accessible to the sequencer, the sequencer asserts a control signal 361 (shown in FIGS. 3 and 4) to register 420 to store the current FREQ value 425 being accumulated by accumulator 410. The FREQ value 425 from the accumulator when the MSE value is less than threshold is a "good" frequency value, meaning a frequency value that is present with the receiver circuitry has a sufficiently high SNR. Register 420 holds the frequency value until a wake-event occurs (signaled to the loop filter 332 by control signal 361 from the sequencer 340) at which time the frequency value from register 420 is loaded into the accumulator 410. The timing loop 392 thus starts its synchronization process (to reach its locks state) upon a wake-event with the loop filter 332 loaded with a frequency value previously determined to be used when the timing loop was at a steady-state level.

Decision feedback equalization (implemented by DFE 326) cancels the post-cursor ISI present in the received signal and thereby reduces the noise present at the slicer input due to post-cursor ISI. The DFE 326 includes a FIFO buffer which stores N previous decisions. The individual decisions are multiplied by individual coefficients which represent the equivalent values of the post-cursor ISI weights that individual decisions add to the current signal.

Figure 5:
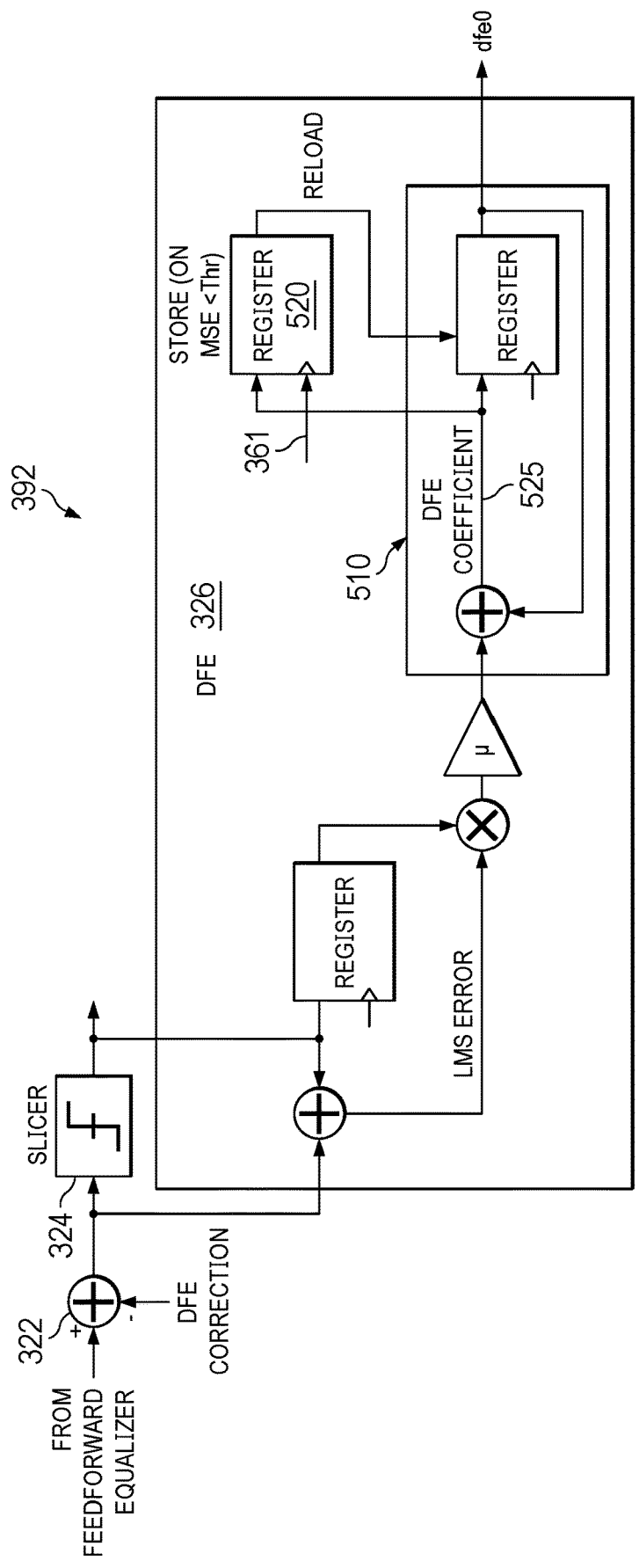
FIG. 5 shows an example of a portion of a decision feedback equalization loop within the receiver's circuitry.

FIG. 5 shows a similar technique to that described above in FIG. 4 employed for the DFE loop 392. FIG. 5 shows at least a portion of the DFE loop 392 including the DFE 326, summer 332, and slicer 324. The DFE 326 includes an accumulator for accumulating the DFE coefficient. Control signal 361 causes the DFE coefficient 525 to be stored in register 520 when the sequencer 340 determines that the MSE value is less than the previously mentioned threshold. The DFE coefficient stored in register 520 is loaded into the accumulator 510 upon occurrence of a subsequent wave-event so that the DFE loop is caused to start synchronizing from an initial DFE coefficient that was determined to be have been determined during the previously steady-state operation of the DFE loop 392.

The Ethernet protocol supports the use of cables of different lengths between two devices such as devices 110 and 120. The length of an Ethernet cable can be up to, for example, 200 meters. A longer cable length results in a smaller SNR than a shorter cable length. In accordance with the disclosed example, the MSE threshold 365 used by the sequencer 340 is customized to the length of the cable between the transmitter and receiver. For a longer cable length and thus smaller received signal magnitude, the CAGC 312 will program the PGA 304 for a higher gain setting and for a shorter cable length the CAGC 312 will program the PGA for a lower gain setting due the higher received signal magnitude. In at least one example, as a proxy for cable length, the sequencer 340 uses the gain setting programmed into the PGA 304 by the CAGC 312 to determine the MSE threshold 365. In the example of FIG. 3, the sequencer 340 includes a look-up table (LUT) 367 to store mappings between gain settings and MSE threshold values. Based on the control signal 313 from the CAGC 312 to the PGA 304 (which sets the PGA gain), the sequencer 340 accesses the LUT 367 to determine the corresponding MSE threshold, and stores that particular MSE threshold as MSE threshold 365 for use as described herein to control the synchronization of certain loops such as the timing loop 390 and DFE loop 392 described above with regard to FIGS. 4 and 5, respectively.

Figure 6:
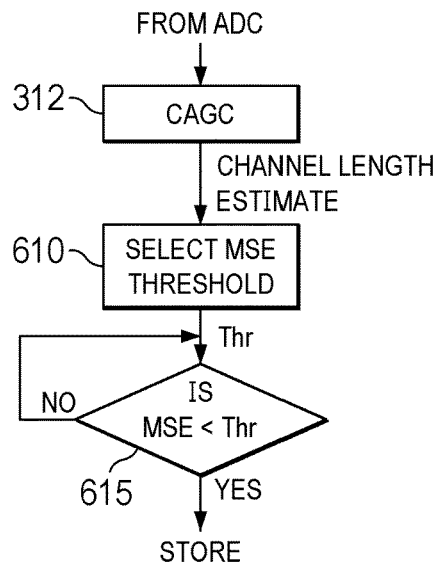
FIG. 6 illustrates an example of a sequence for customizing a mean square error threshold.

FIG. 6 illustrates that the CAGC 312 provides a channel length estimate to the sequencer 340. The channel length estimate may comprise the control signal 313 from the CAGC 312. At 610, the sequencer 340 selects the MSE threshold based on the channel length estimate using, for example, LUT 367. At 615, the sequencer 340 determines whether the current MSE value 345 from the MSE circuit 328 is less than the threshold. If the current MSE value drops below the threshold, a store of the loop state value(s) occurs. The stored loop state value is, for example, the frequency value in the loop filter 332 and/or the DFE coefficient as explained above.

As noted above, an error in one of the loops may detrimentally impact another loop. For example, an error in the DFE loop may impact the timing loop. Residual error accumulation in the DFE loop 392 can lead to an incorrect post-cursor ISI estimation, which will lead to incorrect noise correction at the slicer input and slicer output. This noisy slicer input when provided to the timing loop 390 in turn can detriment tally affect the timing loop feedback path behavior causing it to lock to a point away from a suitable eye opening point. This problem is addressed by the use of multiplexer 336 (FIG. 1). Responsive to a wake-event, the sequencer 340 asserts the control signal 347 to multiplexer 336 to select the 0-input (the output signal from FFE 320 before the summer 322 and thus with no DFE correction). Responsive to the timing loop 390 achieving its lock state, which can be determined based on the MSE value 345 being below a predetermined threshold, the sequencer 340 asserts the control signal 347 so as to cause multiplexer 336 to select its 1-input which causes the signal x(n) after the summer 322 and thus with DFE correction to be provided to the TED 330. During the lock phase, the TED determines the timing error value based on an input (FFE's output signal) that is not affected by the DFE loop and thus by any error that may be present in the DFE loop. Without any errors from the DFE loop, the timing loop will generally settle more quickly than if the TED 330 always used the DFE-equalized values, x(n). During the post-lock phase the TED 330 receives the slicer's input (which includes DFE correction) and the TED then determines the timing error value based on an input that is effected, at least in part, by the DFE loop 392.

An ideal signal for a receiver is received and converted into a symbol within a symbol time interval. However, when the signal travels through a lossy communication link, the transition of the signal to a symbol expands to adjacent intervals. This effect is referred to as inter-symbol interference (ISI). Post-cursor ISI refers to the effect on the current slicer decision from a received signal in a symbol period before the current symbol. Pre-cursor ISI refers to the effect on the current slicer decision from a received signal in a symbol period after the current symbol. In one implementation of a timing error detector, the timing error detector implements logic that balances post-cursor ISI and pre-cursor ISI as shown in Eq. (1):

$$\text{TED} = x(n)*\hat{x}(n-1) - x(n-1)*\hat{x}(n) \quad (1)$$

where, as explained above, x(n) and x(n−1) are the input signals to the slicer 324 in symbol periods n and n−1, and x̂(n−1) and x̂(n) are the output decisions of the slicer 324. The first term in Eq. (1), x(n)*x̂(n−1), is the post-cursor ISI and the second term, x(n−1)*x̂(n), is the pre-cursor ISI.

During a wake-event, if the initial sampling interval happens to occur at approximately half-way during the symbol period, the magnitudes of the pre and post-cursor ISI components may be relatively large and approximately equal. Because the pre-cursor ISI is subtracted from the post-cursor ISI in Eq. (1), the timing error detection value (TED in Eq. 1 above) will be small. Because the timing error detection value will be small initially as the timing loop attempts to converge to a steady state level, the TED 330 will have relatively low gain and thus may take a substantially long time to converge to a lock state.

The TED 330 of FIG. 3, however, implements a first timing error detection technique while attempting to achieve its lock state and a second timing error detection technique after its lock state has been achieved. The first timing error detection technique determines a timing error detection value based on post-cursor ISI but not pre-cursor ISI. This post-cursor ISI-only technique is used as the timing error loop begins to converge to a reach a lock state. While attempting to achieve lock, TED 330 implements post-cursor ISI-only per EQ. 2 below:

$$\text{TED} = x(n)*\hat{x}(n-1) \quad (2)$$

Alternatively, the post-cursor ISI-only values of EQ. (2) can be averaged together to produce a timing error value.

A control signal 371 (FIG. 13) from the sequencer 340 to the TED 330 causes the TED to implement the post-cursor ISI only technique to initially reach the lock state in response to assertion of the WAKE signal 381 from the energy detector 308. Once the timing loop 390 reaches its lock state, the sequencer 340 changes the logic level of the control signal 371 to thereby cause the TED 330 to balance both pre and post-ISI shown in Eq. (1) above.

FIG. 7 illustrates an example of a state diagram implemented by the sequencer 340. The sequencer 340 is a state machine that implements the logic of the state diagram of the example of FIG. 7. At 705, the receiver is in an "idle" state meaning that there is no signal on the line from the other PHY or that neither PHY has started signal transmission. At 710, the state diagram includes a training operation during which timing, digital gain, and DFE loops reach their respective lock states. At 720, the sequencer 340 is in a steady state. During the steady state, the sequencer 340 receives MSE value updates from the MSE circuit 328. Upon an MSE value falling below a threshold 365, the states of the feedback loops are stored. The feedback loop states may include a value indicative of a frequency of the loop filter 332 and/or a value indicative of the DFE coefficient of the DFE 326.

At 730, the sequencer 340 enters into an LPI freeze state. This state may be entered by the controlling software of a transmitting device determining that no data needs to be sent over the communication link to the receiver and issuing an LPI request to the Ethernet controller PHY of the transmitting device. The transmitting device's PHY then sends to the receiver LH symbols for a specified, and then disable its transmitter. The receiving PHY (e.g., example receiver circuitry of FIG. 3) responds by entering the freeze state. The freeze state may include powering down one or more analog components within the receiving circuitry such as the HPF 302, the PGA 304, the ADC 306, and the phase interpolator 309. Further, the timing, digital gain, and DFE loops are frozen (i.e., clocks are ceased thereby preventing the loops from updating their states).

Once the energy detector 308 detects energy on the receivers input, the sequencer 340 enters the LPI acquire state 740. During the LPI acquire state, the previously stored feedback loop states (stored as part of state 720, for example, values indicative of frequency for the loop filter 332 and the DFE coefficient for the DFE 326) are reloaded into their respective loops. Also, in the LPI state, the sequencer 340 asserts control signal 347 to cause multiplexer 336 to select the 0-input to provide the FFE's output signal to the TED 330, instead of the input signal to the slicer which includes DFE-equalized values.

Upon the timing loop reaching a lock state, the sequencer 340 enters the LPI recover state 750 in which the remaining loops (digital gain loop and DFE loop) are enabled. The sequencer 340 also asserts the control signal 347 to cause the multiplexer 336 to select its 1-input so that the DFE-equalized slicer input values are provided as input to the TED 330.

The sequencer 340 then enters the LPI wait state 760 upon expiration of a predetermined timer. During the LPI wait state 760, the sequencer waits for descrambler 383 to achieve lock. Responsive to the descrambler achieving its lock state (as indicated by assertion of descrambler lock signal 384), the sequencer 340 transitions back to the steady state 720.

If, during any of the LPI acquire state 740, the LPI recover state 760, or the LPI waft state 760, the energy detector 308 ceases to detect energy in excess of a threshold, the sequencer 340 changes state back to the LPI freeze state 730.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:
1. A method, comprising:
 transitioning a feedback loop of a receiver circuit to a lower power state;
 detecting that an error signal is below a threshold value, and responsively storing an updated value for the feedback loop based on the detected error signal; and detecting a wake-up event, and responsively loading the updated value into the feedback loop based on the detected wake-up event.

2. The method of claim 1, wherein the feedback loop includes a loop filter, and wherein storing the updated value comprises storing a value indicative of a frequency error.

3. The method of claim 1, wherein the feedback loop includes a decision feedback equalizer, and wherein storing the updated value includes storing a value indicative of equalizer coefficients.

4. The method of claim 1, wherein the error signal comprises a mean square error value.

5. The method of claim 1, further comprising adjusting the threshold value based on a value indicative of a cable length.

6. The method of claim 5, wherein the value indicative of the cable length includes a gain value.

7. The method of claim 6, wherein adjusting the threshold value comprises increasing the threshold value in response to an increase in the gain value.

8. The method of claim 1, further comprising:
detecting that an error value is above a second threshold value, and responsively determining a timing error value without decision feedback equalization based on the detected error value that is above the second threshold value; and
detecting that the error value is below the second threshold value, and responsively determining a timing error value with the decision feedback equalization based on the detected error value that is below the second threshold value.

9. The method of claim 1, wherein the feedback loop includes a timing error detector (TED), and the method further comprising:
before the TED achieves a lock state, determining a timing error value by the TED based on post-cursor inter-symbol interference but not pre-cursor inter-symbol interference; and
after the TED achieves the lock state, determining a timing error value by the TED based on both the post-cursor inter-symbol interference and the pre-cursor inter-symbol interference.

10. A receiver circuit, comprising:
a feedback loop including a circuit, the circuit including a first and second registers; and
a sequencer coupled to the circuit of the feedback loop, the sequencer configured to:
cause the feedback loop to transition to a lower power state;
responsive to an error signal being below a threshold value, cause the first register to store an updated value for the feedback loop; and
responsive to a detected wake-up event, cause the updated value to be stored into the second register.

11. The receiver circuit of claim 10, wherein the circuit of the feedback loop is a loop filter, and wherein the updated value is a value indicative of a frequency error.

12. The receiver circuit of claim 10, wherein the circuit of the feedback loop is a decision feedback equalizer, and wherein the updated value is a value indicative of equalizer coefficients.

13. The receiver circuit of claim 10, wherein the error signal comprises a mean square error value.

14. The receiver circuit of claim 10, wherein the sequencer is further configured to adjust the threshold value based on a value indicative of a cable length.

15. The receiver circuit of claim 14, further comprising an automatic gain control circuit, and wherein the value indicative of the cable length includes a gain value programmed into the automatic gain control circuit.

16. The receiver circuit of claim 15, wherein the sequencer is further configured to increase the threshold value in response to an increase in the gain value.

17. The receiver circuit of claim 10, wherein the sequencer is further configured to:
before a timing loop within the receiver circuit achieves a lock state, configure the timing loop to determine a timing error value without decision feedback equalization; and
responsive to the timing loop achieving the lock state, configure the timing loop to determine a timing error value with the decision feedback equalization.

18. The receiver circuit of claim 10, wherein the feedback loop further includes a timing error detector (TED) coupled to the sequencer, and the sequencer is further configured to cause:
before the TED achieves a lock state, the TED to determine a timing error value based on post-cursor inter-symbol interference but not pre-cursor inter-symbol interference; and
after the TED achieves the lock state, the TED to determine a timing error value based on both the post-cursor inter-symbol interference and the pre-cursor inter-symbol interference.

19. A receiver circuit, comprising:
a feedback loop including a circuit, the circuit including first and second registers; and
a sequencer coupled to the circuit of the feedback loop, the sequencer configured to:
cause the feedback loop to transition to a lower power state;
adjust a threshold value based on a value indicative of a cable length;
responsive to an error signal being below the threshold value, cause the first register to store an updated value for the feedback loop;
responsive to a detected wake-up event, cause the updated value to be stored into the second register; and
enable the feedback loop with the updated value.

20. The receiver circuit of claim 19, wherein the circuit of the feedback loop is a loop filter, and wherein the updated value is a value indicative of a frequency error.

21. The receiver circuit of claim 19, wherein the circuit of the feedback loop is a decision feedback equalizer, and wherein the updated value is a value indicative of equalizer coefficients.

22. The receiver circuit of claim 19, wherein the error signal comprises a mean square error value.

* * * * *